Sept. 17, 1963 R. L. ZINKE 3,104,331

DELAY PULSE GENERATOR

Filed April 26, 1961

INVENTOR.

ROBERT L. ZINKE

BY

Henry Hoff [signature]

ATTORNEY

United States Patent Office 3,104,331

Patented Sept. 17, 1963

3,104,331

DELAY PULSE GENERATOR

Robert L. Zinke, East Northport, N.Y., assignor to Sperry Rand Corporation, Great Neck, N.Y., a corporation of Delaware Filed Apr. 26, 1961, Ser. No. 105,675
5 Claims. (Cl. 307—88.5)

Figure 1:
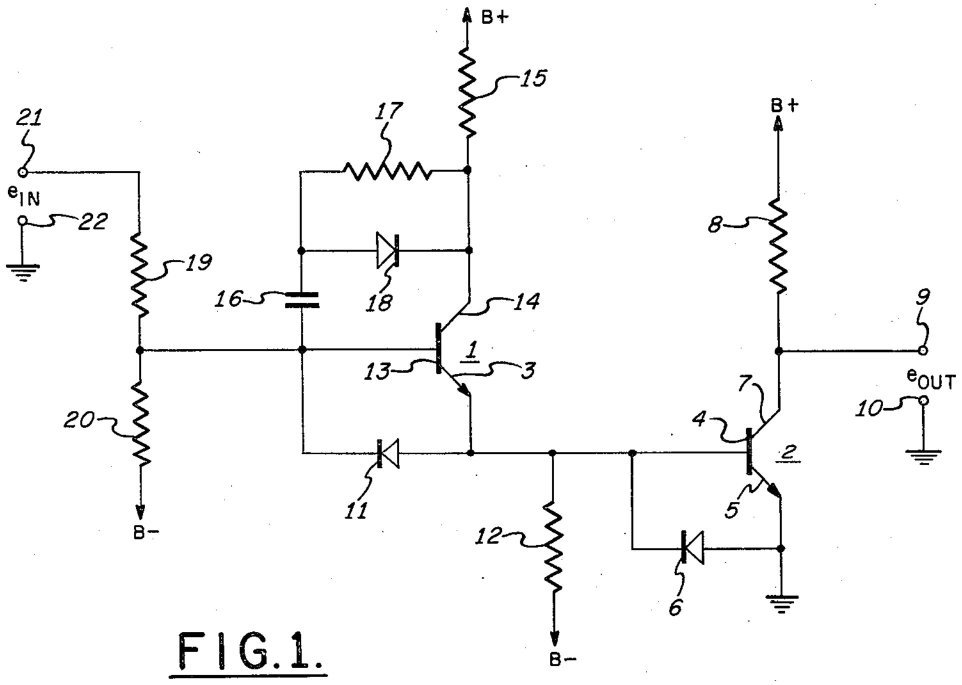

The present invention generally relates to pulse generators and, more particularly, to a simplified and versatile pulse generator for producing an output pulse having leading and trailing edges which may be independently delayed relative to the leading and trailing edges of an input triggering pulse.

Pulse generators are widely utilized in the programming of electronic systems. Many pulse generators are available in the art for accomplishing a variety of specific timing purposes. For example, it is sometimes desirable to produce an output pulse which is delayed by a predetermined time interval from the occurrence of an initiating or trigger pulse. In particular, it may be required that either or both of the leading and trailing edges of the output pulse be delayed by a predetermined time interval relative to the occurrence of the trigger pulse. Special purpose circuits of varying complexity have been developed to accomplish respective ones of these desiderata.

It is the principal object of the present invention to provide a delay pulse generator characterized by structural simplicity and functional versatility.

Another object of the invention is to provide a pulse generator for producing an output pulse having leading and trailing edges which may be independently delayed relative to the occurrence of an input trigger pulse.

A further object is to provide a transistorized pulse generator for producing an output rectangular wave form having sharply sloping leading and trailing edges occurring at accurately definable times relative to the occurrences of the leading and trailing edges of an input trigger pulse.

These and other objects of the present invention, as will appear more fully from a reading of the following specification, are accomplished in a preferred embodiment by the provision of first and second transistors connected in cascade. Each transistor includes a base, a collector and an emitting electrode. The base of the second transistor is directly connected to the emitter of the first transistor. Means are provided for initially biasing the bases of both transistors to cutoff. The first transistor is additionally provided with a capacitor connected between the collector and base electrodes. A feature of the invention is that the feedback action provided by the capacitor may be readily controlled to take place upon the occurrence of either the leading edge or the trailing edge or upon the occurrences of both edges of an input trigger pulse which is applied to the base of the first transistor.

In a first species of the invention, the capacitive feedback action takes place upon the occurrence of the leading edge of the trigger pulse. This results in a linearly increasing flow of emitter current in the first transistor. When the increasing emitter current reaches a predetermined value, the base electrode of the second transistor becomes forwardly biased and the second transistor is driven rapidly into saturation. The second transistor is returned to a cutoff condition upon the occurrence of the trailing edge of the trigger pulse. Thus, there is at the collector electrode of the second transistor an output pulse having a leading edge which is delayed by a predetermined interval following the initiation of the trigger pulse and having a trailing edge concurrent with the trailing edge of said trigger pulse.

By allowing the capacitive feedback action to take place only upon the occurrence of the trailing edge of the trigger pulse, a modified output pulse is produced at the collector of the second transistor. The leading edge of the modified pulse occurs simultaneously with the leading edge of the trigger pulse. The trailing edge of the modified pulse occurs after a predetermined interval following the occurrence of the trailing edge of the trigger pulse. When the capacitive feedback action is permitted to occur upon the occasion of both the leading and the trailing edges of the trigger pulse, both the leading and the trailing edges of the output pulse are delayed relative to the leading and trailing edges, respectively, of the trigger pulse.

The capacitive feedback action selectively occurs with the leading or trailing edges of the trigger pulse in accordance with the poling of a diode element which is connected in series circuit with the feedback capacitor between the collector and base electrodes of the first transistor. The capacitor feedback action takes place only when the diode is conductive. By shortcircuiting the diode terminals, the feedback action occurs during both the leading and trailing edges of the trigger pulse.

Figure 2:
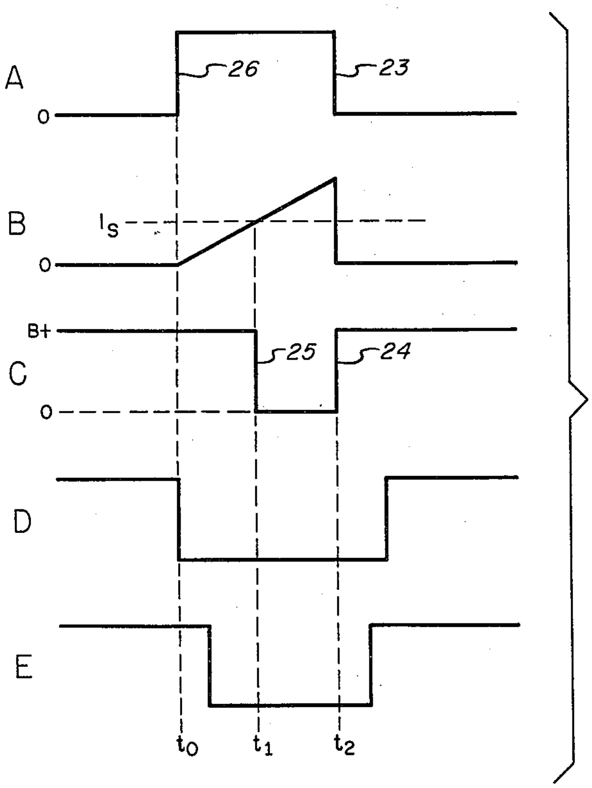

For a more complete understanding of the present invention, reference should be had to the following specification and to the appended figures of which:

FIG. 1 is a simplified schematic diagram of a representative embodiment of the present invention; and FIG. 2 is a series of idealized waveforms useful in explaining the operation and versatility of the embodiment of FIG. 1.

Referring to FIG. 1, NPN transistors 1 and 2 are connected in cascade with emitter 3 of transistor 1 being directly connected to the base 4 of transistor 2. The emitter 5 of transistor 2 is connected to ground and to the anode of diode 6. The cathode of diode 6 is connected to base 4. The collector 7 of transistor 2 is connected to output terminal 9 and to a source of positive potential by resistor 8. The output waveform generated by the embodiment of FIG. 1 is made available across terminals 9 and 10.

The emitter 3 of transistor 1 is connected to the anode of diode 11 and to a source of negative potential by resistor 12. The cathode of diode 11 is connected to the base 13 of transistor 1. Collector 14 is coupled to a source of positive potential by resistor 15. A feedback circuit comprising capacitor 16 and diode 18 is connected between collector 14 and base 13 of transistor 1. In the case of the disclosed embodiment, the cathode of diode 18 is connected to collector 14. As will be seen more fully later, the poling diode 18 may be reversed or the terminals thereof may be short circuited depending upon the delay characteristic desired of the output pulse produced across the terminals 9 and 10. Base 13 is connected to the junction of resistors 19 and 20. Resistor 20 is coupled to a source of negative potential whereas resistor 19 is connected to input terminal 21. An input trigger pulse is applied across terminals 21 and 22.

Diode 6 is forwardly biased to conduction by the negative potential applied to resistor 12. A small potential drop of about .5 volt is produced across the conducting diode, biasing base 4 of transistor 2 at a potential of −.5 volt relative to ground. Similarly, diode 11 is forwardly biased to conduction by the −.5 volt potential of base 4 and the more negative potential applied via resistor 20. A small potential drop of about .5 volt appears across conducting diode 11, biasing base 13 at a potential of −1 volt relative to ground.

In operation, a positive going trigger pulse, represented by waveform A of FIG. 2, is applied across input terminals 21 and 22. Upon the occurrence of leading edge 26, diode 11 is abruptly rendered nonconductive, and transistor 1 is driven toward saturation. The full B+ potential initially appearing at the collector 14 begins to fall rendering diode 18 conductive and initiating capacitive feedback action between collector 14 and base 13.

As is well understood in the art, the feedback provided by capacitor 16 produces the so-called "Miller" effect which tends to oppose any abrupt change in the collector potential. Consequently, the collector current (a function of the voltage drop developed across resistor 15) and, hence, the flow of current in the emitter 3, increase substantially linearly from its cutoff value as indicated in waveform B of FIG. 2. After a predetermined time interval, the linearly increasing emitter current reaches a value which causes the potential across diode 6 to reverse. This value of current is designated by the dashed line $I_s$ superimposed on waveform B. Diode 6 is abruptly rendered nonconductive allowing base 4 of transistor 2 to become forwardly biased relative to emitter 5. Transistor 2 rapidly switches to a saturated condition.

Waveform C of FIG. 2 represents the potential appearing across output terminals 9 and 10. During the time before the linearly increasing emitter current of transistor 1 reaches the current value $I_s$, transistor 2 is cut off. The potential at the collector of transistor 2 remains at B+ during this interval. At time $t_1$, the emitter current of transistor 1 reaches the value $I_s$ placing transistor 2 into a saturated condition. The potential at collector 7 falls to substantially ground potential and remains at such potential until transistor 2 is again cut off at time $t_2$.

It will be seen that transistor 2 is cut off concurrently with the trailing edge 23 of the input trigger pulse represented by waveform A of FIG. 2. As previously explained, the collector and emitter current of transistor 1 rises substantially linearly rather than abruptly upon the application of the input trigger pulse because of the capacitive feedback action provided upon the conduction of diode 18. When diode 18 is poled as indicated in FIG. 1, with the cathode thereof connected to collector 14, diode 18 conducts only upon the occurrence of the leading edge 26 of the trigger pulse. Upon the occurrence of the trailing edge 23, however, the rising potential at collector 14 renders diode 18 nonconductive and effectively disconnects capacitor 16 from the circuit.

The purpose of resistor 17, which is connected across diode 18, merely is to provide a path for slowly restoring the charge across capacitor 16 during the interval between successive input trigger pulses. Resistor 17 substantially isolates capacitor 16 from the base and collector electrodes of transistor 1 during the occurrence of the trailing edge 23 of the trigger pulse and precludes Miller feedback action. Thus, transistors 1 and 2 are quickly driven to cutoff producing the abruptly rising edge 24 of the output pulse of waveform C.

The output pulse C is characterized by a leading edge 25 which is delayed by a predetermined interval ($t_1-t_0$) following the initiation of the trigger pulse at $t_0$. The trailing edge 24 occurs simultaneously with the trailing edge 23 of the trigger pulse. The delay of the leading edge 25 is determined by the time required for the linearly increasing emitter current of transistor 1 to reach the value $I_s$ of waveform B. This time may be varied by adjusting, for example, the value of resistor 12. Merely by reversing the poling of diode 18, i.e. by connecting the anode thereof to collector 14 and the cathode to capacitor 16, diode 18 will conduct only upon the occurrence of the trailing edge 23 of the trigger pulse. In this case, an output pulse represented by waveform D will be produced.

It will be noted that the leading edge of pulse D is concurrent with the leading edge of the trigger pulse whereas the trailing edge of pulse C is delayed relative to the occurrence of the trailing edge of the trigger pulse. The amount of the delay is determined by the time required, subsequent to the trailing edge of the trigger pulse, for the linearly decreasing emitter current of transistor 1 to fall to a value which renders diode 6 conductive. Transistor 2 is cutoff sharply upon the conduction of diode 6 to produce the delayed trailing edge of waveform D.

Waveform E represents the output pulse that is produced in the event that capacitive feedback action is permitted to occur upon the occurrences of both the leading and trailing edges of the trigger pulse represented by waveform A. This can be accomplished merely by short circuiting the terminals of diode 18. It will be observed that both the leading and trailing edges of output pulse E are delayed relative to the leading and trailing edges, respectively, of the trigger pulse. The individual amounts of delay may be made equal or unequal depending on the length of time required for the linearly increasing emitter current of transistor 1 to rise to the value required to saturate transistor 2 relative to the time required for the linearly decreasing current of emitter current from transistor 1 to fall to the value for cutting off transistor 2. It is convenient to vary the amounts of delay by changing the value of the positive potential applied via resistor 15 to the collector of transistor 1.

It can be seen from the foregoing specification that the objects of the present invention have been achieved by the provision of first and second transistors connected in cascade with the emitter electrode of the first transistor being connected directly to the base electrode of the second transistor. The second transistor is driven into cutoff and saturation conditions in accordance with the magnitude of the emitter current flow from the first transistor. The required length of time, following the occurrence of a trigger pulse, for the emitter current to reach the values for cutting off and saturating the second transistor may be controlled by permitting or precluding capacitive feedback between the collector and base electrodes of the first transistor. The occasions of the capacitive feedback, relative to the occurrences of the leading and trailing edges of the trigger pulse, are determined by the poling of a unidirectional impedance connected in series circuit with the capacitor between the collector and base electrodes of the first transistor.

While the invention has been described in its preferred embodiment, it is understood that the words which have been used are words of description rather than of limitation and that changes within the purview of the appended claims may be made without departing from the true scope and spirit of the invention in its broader aspects.

What is claimed is:

1. A delay pulse generator for producing an ouput pulse having leading and trailing edges which may be independently delayed relative to the occurrence of a trigger pulse, said generator comprising first and second transistors connected in cascade, each transistor including a base, a collector and an emitter, the emitter of said first transistor being coupled to the base of said second transistor, means for initially biasing to cut off the bases of both said first and second transistors, said means including a first diode connected between the base and emitter of said first transistor and a second diode connected between the base and emitter of said second transistor, a capacitor having two terminals, one of said terminals being directly coupled to the base of said first transistor, and means for coupling the other of said terminals to the collector of said first transistor, the base of said first transistor receiving said trigger pulse and the collector of said second transistor delivering said output pulse.

2. A delay pulse generator for producing an output pulse having a leading edge which bears a first time relationship to the leading edge of a trigger pulse and having a trailing edge which bears a second time relationship to the trailing edge of said trigger pulse, said generator comprising first and second transistors connected in cascade, each transistor including a base, a collector and an emitter, the emitter of said first transistor being coupled to the base of said second transistor, means for initially biasing to cut off the bases of both said first and second transistors, said means including a first diode connected between the base and emitter of said first transistor and a second diode connected between the base and the emitter of said second transistor, a capacitor having two terminals, one of said terminals being directly coupled to the base of said first transistor, and a third diode for coupling the other of said terminals to the collector of said first transistor, the base of said first transistor receiving said trigger pulse and the collector of said second transistor delivering said output pulse.

3. A delay pulse generator for producing an output pulse having a leading edge delayed with respect to the leading edge of a trigger pulse and having a trailing edge concurrent with the trailing edge of said trigger pulse, said generator comprising first and second NPN transistors connected in cascade, each transistor including a base, a collector and an emitter, the emitter of said first transistor being coupled to the base of said second transistor, means for initially biasing to cut off the bases of both said first and second transistors; said means including a first diode having an anode connected to said emitter of said first transistor and a cathode connected to said base of said first transistor and a second diode having an anode connected to said emitter of said second transistor and a cathode connected to said base of said second transistor, a capacitor having two terminals, one of said terminals being directly coupled to the base of said first transistor, and a third diode having a cathode connected to said collector of said first transistor and having an anode coupled to the other of said terminals of said capacitor, said base of said first transistor receiving said trigger pulse and said collector of said second transistor delivering said output pulse.

4. A delay pulse generator as defined in claim 2 and further including a resistor connected across said anode and said cathode of said third diode.

5. A delay pulse generator as defined in claim 3 and further including a resistor connected across said anode and said cathode of said third diode.

References Cited in the file of this patent

UNITED STATES PATENTS

| | | |
|---|---|---|
| 2,872,571 | Lenz | Feb. 3, 1959 |
| 3,018,420 | Norris | Jan. 23, 1962 |